Figure 1:
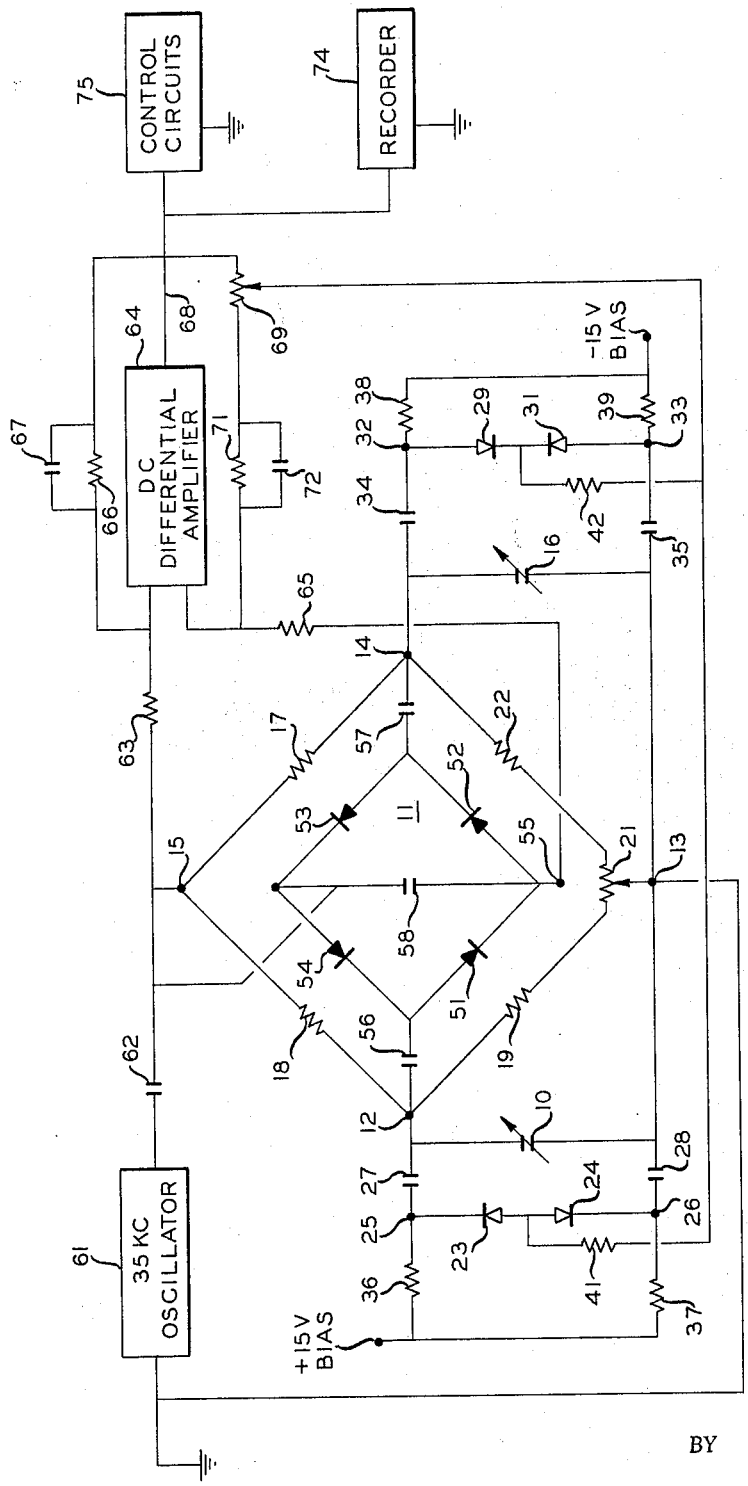

INVENTORS
D. A. FLUEGEL
L. E. KUNTZ
BY
*Young & Quigg*
ATTORNEYS

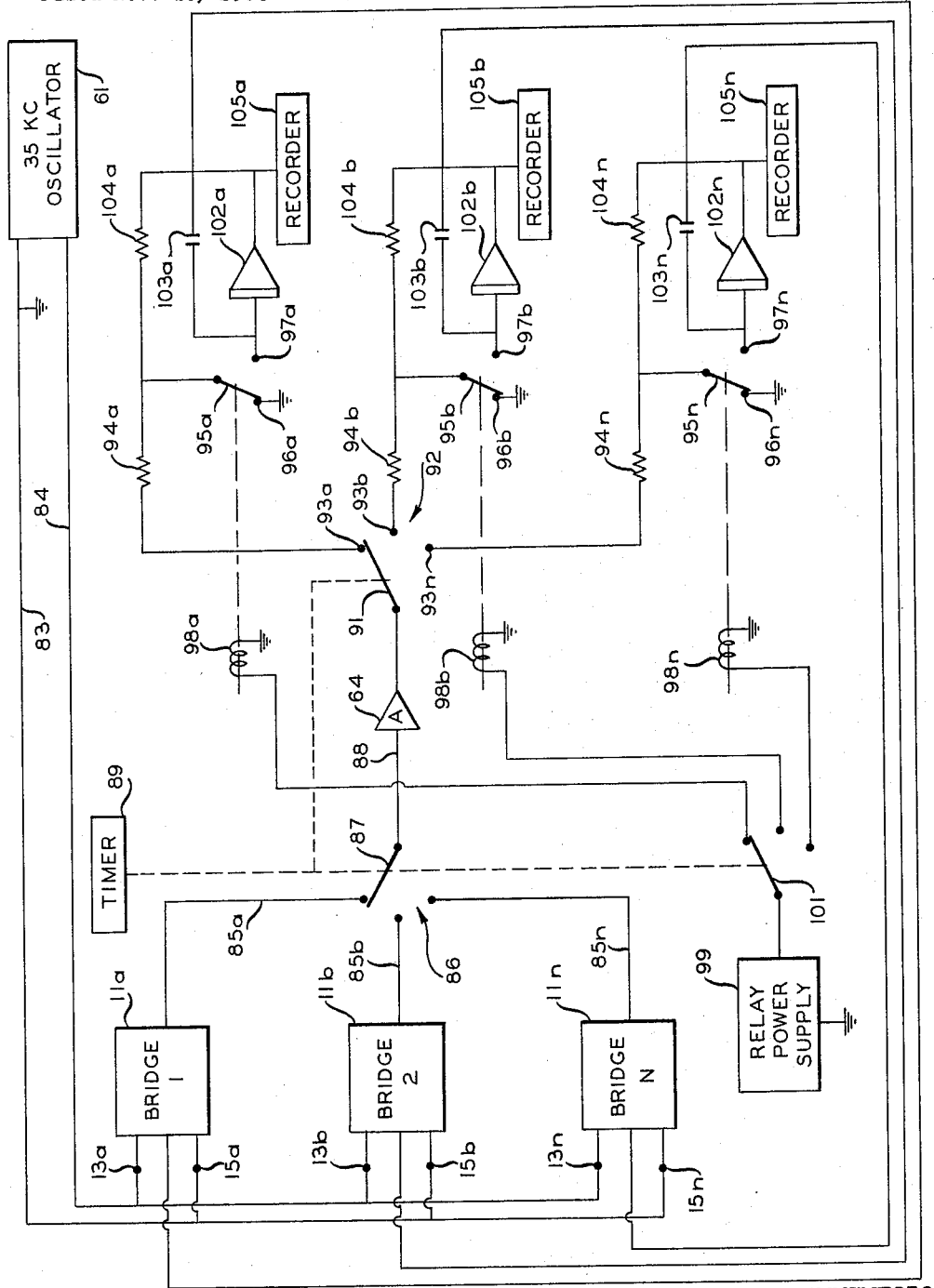

United States Patent Office 3,286,171
Patented Nov. 15, 1966

3,286,171
TRANSFORMERLESS A.C. BRIDGE HAVING A D.C. OUTPUT
Dale A. Fluegel and Louis E. Kuntz, Bartlesville, Okla., assignors to Phillips Petroleum Company, a corporation of Delaware
Filed Nov. 18, 1964, Ser. No. 412,116
9 Claims. (Cl. 324—60)

This application relates to an electrical measuring apparatus. In one aspect the invention relates to a novel alternating current bridge network which does not require a transformer between the oscillator and the bridge. In another aspect the invention relates to a transformerless A.C. bridge network which produces a D.C. output signal.

The measurement of dielectric properties of material has become a valuable industrial and laboratory procedure toward determining compositions and/or other characteristics of a material. In such instances a measuring or detecting element in the form of an electrical capacitor is disposed so that the material having the characteristic to be determined forms the dielectric of the capacitor. A measurement of the capacitance of the capacitor thus provides information regarding the characteristics of the test material. This procedure can be employed in numerous processes, for example to detect a liquid level, the moisture content of a material, the composition of materials, and the thickness of sheets of material. The accuracy of the measurement depends to a large extent on the accuracy of the measurement of the capacitance of the resulting capacitor.

In prior art systems the material to be measured forms the dielectric of a capacitor which is connected in one arm of a bridge network. Alternating potential is applied through a transformer to opposite terminals of the bridge network and also to the first input of a phase detector. The output signal from the bridge network is applied through an amplifier to a second input of the phase phase detector. In many instances it has become desirable to utilize the bridge measuring networks at widely scattered locations in the field, for example to measure the BS and W (basic sediment and water) content of widely spaced oil wells, to determine liquid level in widely scattered storage tanks and the like. In these instances the prior systems have generally required either a transformer or an amplifier at each measuring site to raise the bridge output level to a sufficiently high value to avoid losing the information in the signal during transmission over long distances to the central receiving station due to stray currents and other factors. The utilization of the transformer and/or amplifier at each test site greatly increases the initial cost of such a system as well as the difficulty of maintaining uniform sensitivity with the various bridges. Accordingly it has become desirable to obtain a bridge measuring network which does not require the utilization of a transformer and/or amplifier in association with the bridge at the measuring site and which can transmit the bridge output signal over long distances while maintaining the value of the information in the signal.

In accordance with the invention it has been discovered that these objectives can be obtained and the disadvantages of the prior art systems avoided by utilizing a bridge network having the oscillator directly connected to the terminals of the bridge network and the output of the bridge network connected through a full wave rectifying bridge to the inputs of a D.C. differential amplifier. The rectifying bridge and the D.C. differential amplifier can be separated by many miles of cable without significant loss of signal information, thus permitting utilization of the bridge network at isolated measuring sites without requiring either a transformer or an amplifier at each test site.

Accordingly it is an object of the invention to provide an improved and simplified apparatus and method for measuring the capacitance of a condensor. Another object of the invention is to provide an improved apparatus and method for detecting and analyzing material in terms of the dielectric properties thereof. Another object of the invention is to provide a novel bridge network which does not require a transformer at either the input or output thereof. Yet another object of the invention is to provide a method and apparatus for measuring dielectric properties of a material and transmitting a low signal voltage representative of such measurement over long distances without the requirement of a transformer or amplifier at the measurement site. A still further object of the invention is to provide a novel bridge network of simple and inexpensive construction.

Other objects, aspects and advantages of the invention will be apparent from a study of the disclosure, the drawings and the appended claims to the invention.

In the drawings FIGURE 1 is a schematic representation of a capacitance measuring network in accordance with one embodiment of the invention, and FIGURE 2 is a schematic representation of a system in accordance with the invention for measuring the dielectric properties of materials at various locations.

Referring now to the drawings and to FIGURE 1 in particular, there is shown a capacitor 10 which comprises the detecting element employed to measure the dielectric properties of a test material. This capacitor can be of various configuration, depending upon the particular application of the instrument. If the thickness of a sheet of materials is to be measured, capacitor 10 can be in the form of a pair of spaced plates having the test material therebetween. In detecting liquid levels, it is convenient to employ an elongated probe element which comprises an open cylinder having a second electrode disposed axially therein. Capacitor 10 can be a measuring capacitor suitable for use in a basic sediment and water monitor. Detecting element 10 obviously can be in the form of two or more spaced electrodes. Two specific examples of suitable measuring elements are described in U.S. Patent 2,904,751, J. R. Parsons, issued September 15, 1959.

Bridge circuit 11 has first, second, third, and fourth bridge terminals 12, 13, 14, and 15, respectively. Measuring capacitor 10 is connected between a first pair of bridge terminals 12 and 13 to form a first arm of the bridge. A reference capacitor 16 can be connected between a second pair of bridge terminals 13 and 14 to form a second arm of the bridge. An impedance element such as resistor 17 can be connected between terminals 14 and 15, while a second impedance element such as resistor 18 can be connected between terminals 12 and 15. A resistor 19, potentiometer 21, and resistor 22 can be connected between bridge terminals 12 and 14, with the contactor of potentiometer 21 being connected to bridge terminal 13. First and second voltage sensitive capacitors 23 and 24 are connected in series in back to back relationship between first and second biasing terminals 25 and 26. A D.C. isolation capacitor 27 connects biasing terminal 25 to bridge terminal 12, while a D.C. isolation capacitor 28 connects biasing terminal 26 to bridge terminal 13. Third and fourth voltage sensitive capacitors 29 and 31 are connected in series in back to back relationship between third and fourth biasing terminals 32 and 33. A D.C. isolation capacitor 34 connects biasing terminal 32 to bridge terminal 14 while a D.C. isolation capacitor 35 connects biasing terminal 33 to bridge terminal 13. A D.C. bias voltage of a first polarity is applied through resistors 36 and 37 to biasing terminals 25 and 26 to maintain voltage sensitive capacitors 23 and 24 in the nonconducting condition. A D.C. bias voltage of polarity opposite that applied to biasing terminals 25 and 26 is applied through resistors 38 and 39 to biasing terminals 32 and 33 respectively to maintain voltage sensitive capacitors 29 and 31 in nonconducting condition. A bridge rebalancing voltage can be applied through resistor 41 to the junction between voltage sensitive capacitors 23 and 24 and through resistor 42 to the junction between voltage sensitive capacitors 29 and 31 to maintain the bridge network in a balanced condition for the dielectric properties of the test material having a predetermined value corresponding to the zero condition of the test. As the same voltage is applied to the junction between capacitors 23 and 24 and to the junction between capacitors 29 and 31, it is desirable that one set of the capacitors be connected in the opposite relationship to that of the other set of capacitors. For example capacitors 23 and 24 are illustrated as being connected in cathode to cathode relationship while 29 and 31 are illustrated as being connected in anode to anode relationship. However the two sets of voltage sensitive capacitors can be connected in identical relationship and a phase inverter utilized to reverse the polarity of the rebalancing voltage applied to one of the junctions. Suitable voltage sensitive capacitors are silicon capacitors, such as HC 7005 manufactured by Hughes Aircraft Company of Newport Beach, California.

First, second, third and fourth rectifying devices 51, 52, 53 and 54 are connected in closed series with each other in front to back relationship. The rectifying devices 51–54 can be any suitable device known in the art such as diodes. One example of a suitable rectifying device is a silicon diode. The junction between diodes 51 and 52 is connected to a bridge output terminal 55, while the junction between diodes 53 and 54 is connected to bridge terminal 15. A D.C. isolation capacitor 56 connects bridge terminal 12 to the junction between diodes 51 and 54, while D.C. isolation capacitor 57 connects bridge terminal 14 to the junction between diodes 52 and 53. D.C. isolation capacitor 58 connects bridge terminal 15 to the junction between diodes 51 and 52. The bridge is energized by oscillator 61, one output terminal of which is connected directly to bridge terminal 13 while the other output terminal thereof can be connected through a D.C. isolation capacitor 62 to bridge terminal 15. Oscillator 61 can be a conventional type, such as one utilizing a transistor with a suitable tuned circuit and which is adapted to produce an A.C. signal having a suitable frequency, for example on the order of 35 kilocycles.

Bridge terminal 15 is connected through resistor 63 to one input of the D.C. differential amplifier 64 while output terminal 55 is connected through resistor 65 to a second input of amplifier 64. Resistor 66 and capacitor 67 are connected in parallel between output terminal 68 of amplifier 64 and the first input terminal of amplifier 64. A potentiometer 69 and a resistor 71 are connected in series between output terminal 68 and the second input terminal of amplifier 64. A capacitor 72 is connected in parallel with resistor 71. The contactor of potentiometer 69 is connected through resistors 41 and 42 to the respective junction between capacitors 23 and 24 and the junction between capacitors 29 and 31 to apply a rebalancing signal representative of the output of amplifier 64 to the voltage sensitive capacitors. Output terminal 68 of amplifier 64 can be applied to the input of suitable recording means 74 or to the input of suitable control circuit 75 as desired.

The operation of FIGURE 1 will now be described. The A.C. output of oscillator 61 is applied to the power input terminals 15 and 13 of bridge 11. It should be obvious that this forms a capacitance measuring bridge. If the bridge is balanced there is a zero potential difference between terminals 15 and 55. The bridge network is initially balanced with respect to capacitance by varying the capacitance of the reference capacitor 16. The bridge is also initially balanced with respect to the resistance of the bridge arm by suitable adjustment of the contactor of potentiometer 21. After initial balancing of the bridge, any unbalancing of the bridge due to a change in the dielectric properties of capacitor 10 results in a potential difference between terminals 15 and 55. The unbalanced voltage difference between terminals 15 and 55, which is a low value direct current voltage, is applied to the inputs of amplifier 64. Thus the output of amplifier 64 is representative of a change in a characteristics of the dielectric material in measuring capacitor 10 from zero conditions.

Referring now to FIGURE 2, a plurality of bridge networks 11, 11a, 11b . . . 11n are positioned in various widely spaced test sites. Each of the bridge networks 11a to 11n can have the bridge circuit arrangement illustrated in FIGURE 1. A 35 kilocycle oscillator 61 and a D.C. differential amplifier 64 are located in a central measuring station. A cable containing lines 83 and 84 connect the two output terminals of oscillator 61 to the respective bridge terminals 13a and 15a, 13b and 15b, . . . 13n and 15n. A two-wire cable 85a connects bridge output terminals 15a and 55a to two contact points of stepping switch 86. Similarly two-wire cables 85b . . . 85n connect the outputs of bridges 11b . . . 11n to corresponding contacts of stepping switch 86. A two pronge contactor 87 of stepping switch 86 connects the two wires of the respective cable 85a–85n through two-wire cable 88 to the inputs of differential amplifier 64. Contactor 87 can be manually operated or actuated by a timer 89 to selectively connect the outputs of the bridge circuits to the inputs of amplifier 64. The output of amplifier 64 is connected to contactor 91 of a stepping switch 92, having a plurality of contacts 93a . . . 93n. Each of contacts 93a . . . 93n is connected through a respective resistor 94a . . . 94n to the contactor of the respective switch 95a . . . 95n. Each of the switches 95a . . . 95n is associated with a grounded terminal 96a . . . 96n and a second terminal 97a . . . 97n. Contactors 95a . . . 95n are actuated by the respective relay coil 98a . . . 98n. Relay coils 98a . . . 98n are selectively actuated by a relay power supply 99 by means of stepping switch 101 connected therebetween. Stepping switches 92 and 101 can be actuated manually or automatically by timer 89 in sequence corresponding to the sequence of activation of stepping switch 86. Each of amplifiers 102a . . . 102n has its input connected to input terminal 97α . . . 97n. Capacitors 103a . . . 103n are connected between the output and the input of the respective amplifier 102a . . . 102n. Resistors 104a . . . 104n are connected between the output of the respective amplifier 102a . . . 102n and the contactor of the corresponding switch 95a . . . 95n. Recorders 105a . . . 105n are connected to the output of the respective amplifier 102a . . . 102n. Thus the elements 93 through 105 of each set form a track and hold circuit. Each track and hold circuit is connected to the output of amplifier 64 when the input of amplifier 64 is connected to the corresponding bridge circuit. When the respective track and hold circuit is disconnected from the output of amplifier 64, the respective relay 98a . . . 98n actuates the corresponding switch 95a . . . 95n to the grounded contact position to permit the amplifier to be converted to a hold circuit to provide a continuous uniform constant output representative of the last signal from its respective bridge circuit until such time as the respective bridge circuit is again read.

Thus it can be seen that only a single oscillator and a single differential amplifier are required at the central reading station, and the equipment at the various test sites does not require either a transformer or an amplifier.

The following example is presented in further illustration of the invention and should not be construed to unduly limit the invention.

*Example*

In a system represented by FIGURE 1 the components had values as follows:

| | |
|---|---|
| Resistors 36, 37, 38, 39, 41 and 42 | 1 megohm. |
| Resistors 17, 18, 19 and 22 | 10 kilohms. |
| Potentiometer 21 | 500 ohms. |
| Resistors 63 and 65 | 4.7 kilohms. |
| Resistors 66 and 71 | 10 megohms. |
| Potentiometer 69 | 10 kilohms. |
| Capacitors 27, 28, 34 and 35 | .05 microfarad. |
| Capacitors 56 and 57 | .01 microfarad. |
| Capacitor 58 | .22 microfarad. |
| Capacitors 62, 67 and 72 | .1 microfarad. |
| Diodes 51, 52, 53 and 54 | IN629 silicon diodes. |
| Capacitors 23, 24, 29 and 31 | HC 7005 silicon capacitors. |
| Oscillator 61 | 35 kilocycles. |

Reasonable variations and modifications are possible within the scope of the foregoing disclosure, the drawing and the appended claims to the invention.

We claim:

1. Electrical measuring apparatus comprising in combination:
   (1) a bridge network comprising first, second, third and fourth bridge terminals; a measuring capacitor connected between said first and second bridge terminals; a reference capacitor connected between said second and third bridge terminals; a first resistor connected between said third and fourth bridge terminals; a second resistor connected between said first and fourth bridge terminals; a third resistor, a potentiometer and a fourth resistor connected in series between said first and third bridge terminals; the contactor of said potentiometer being connected to said second bridge terminal; first and second biasing terminals; a first capacitor connecting said first biasing terminal to said first bridge terminal; a second capacitor connecting said second biasing terminal to said second bridge terminal; first and second voltage sensitive capacitors connected in series in back-to-back relationship between said first and second biasing terminals; third and fourth biasing terminals; a third capacitor connecting said third biasing terminal to said third bridge terminal; a fourth capacitor connecting said fourth biasing terminal to said second bridge terminal; third and fourth voltage sensitive capacitors connected in series in back-to-back relationship between said third and fourth biasing terminals, said third and fourth voltage sensitive capacitors being connected to each other in a manner opposite to the connection of said first and second voltage sensitive capacitors; means for applying a D.C. bias voltage of a first polarity to said first and second biasing terminals; means for applying a D.C. bias voltage of opposite polarity to said third and fourth biasing terminals; a bridge output terminal; first, second, third and fourth diodes connected in closed series in front-to-back relationship with each other, the junction between said first and second diodes being connected to said bridge output terminal, the junction between said third and fourth diodes being connected to said fourth bridge terminal; a fifth capacitor connected between said first bridge terminal and the junction between said first and fourth diodes; a sixth capacitor connected between said third bridge terminal and the junction between said second and third diodes; and a seventh capacitor connected between said fourth bridge terminal and the junction between said first and second diodes;

(2) a voltage source comprising an oscillator having first and second output terminals, means for connecting said first output terminal of said oscillator directly to said second bridge terminal, and a D.C. isolation capacitor connected between said fourth bridge terminal and the said second output terminal of said oscillator;

(3) a circuit comprising a D.C. differential amplifier having first and second input terminals and an output terminal; means connecting said first input terminal of said amplifier to said fourth bridge terminal, means connecting said second input terminal of said amplifier to said bridge output terminal; a fifth resistor and an eighth capacitor connected in parallel between said output terminal of said amplifier and said first input terminal of said amplifier; a sixth resistor and a second potentiometer connected in series between said output terminal of said amplifier and said second input terminal of said amplifier; a ninth capacitor connected in parallel with said sixth resistor; and indicating means connected to said output terminal of said amplifier; and (4) a rebalancing circuit comprising means for connecting the contactor of said second potentiometer to the junction between said first and second voltage sensitive capacitors and to the junction between said third and fourth voltage sensitive capacitors.

2. Electrical measuring apparatus comprising in combination:
   (1) a plurality of bridge networks, each of said bridge networks comprising first, second, third and fourth bridge terminals; a measuring capacitor connected between said first and second bridge terminals; a reference capacitor connected between said second and third bridge terminals; a first resistor connected between said third and fourth bridge terminals; a second resistor connected between said first and fourth bridge terminals; a third resistor, a potentiometer and a fourth resistor connected in series between said first and third bridge terminals; the contactor of said potentiometer being connected to said second bridge terminal; first and second biasing terminals; a first capacitor connecting said first biasing terminal to said first bridge terminal; a second capacitor connecting said second biasing terminal to said second bridge terminal; first and second voltages sensitive capacitors connected in series in back-to-back relationship between said first and second biasing terminals; third and fourth biasing terminals; a third capacitor connecting said third biasing terminal to said third bridge terminal; a fourth capacitor connecting said fourth biasing terminal to said second bridge terminal; third and fourth voltage sensitive capacitors connected in series in back-to-back relationship between said third and fourth biasing terminals, said third and fourth voltage sensitive capacitors being connected to each other in a manner opposite to the connection of said first and second voltage sensitive capacitors; means for applying a D.C. bias voltage of a first polarity to said first and second biasing terminals; means for applying a D.C. bias voltage of opposite polarity to said third and fourth biasing terminals; a bridge output terminal; first, second, third and fourth diodes connected in closed series in front-to-back relationship with each other, the junction between said first and second diodes being connected to said bridge output terminal, the junction between said third and fourth diodes being connected to said fourth bridge terminal; a fifth capacitor connected between said first bridge terminal and the junction between said first and fourth diodes; a sixth capacitor connected between said third bridge terminal and the junction between said second and third diodes; and a seventh capacitor connected between said fourth bridge terminal and the junction between said first and second diodes;

(2) a voltage source comprising an oscillator having first and second output terminals, means for connecting said first output terminal of said oscillator directly to said second bridge terminal of each of said plurality of bridge networks, and a D.C. isolation capacitor connected between said fourth bridge terminal of each of said plurality of bridge networks and said second output terminal of said oscillator;

(3) a circuit comprising a D.C. differential amplifier having first and second input terminals and an output terminal; said amplifier being located at a different locality from the locations of said plurality of bridge networks; means for selectively connecting said first input terminal of said amplifier to the fourth bridge terminal of a respective one of said plurality of bridge networks and for selectively connecting said second input terminal of said amplifier to the bridge output terminal of said respective one of said plurality of bridge networks; and indicating means connected to said output terminal of said amplifier; and (4) a rebalancing circuit comprising means responsive to the output of said amplifier for applying a rebalancing voltage to the junction between the respective first and second voltage sensitive capacitors and to the junction between the respective third and fourth voltage sensitive capacitors.

3. Electrical measuring apparatus comprising in combination:

(1) a bridge network comprising first, second, third and fourth bridge terminals; a measuring capacitor connected between a first pair of adjacent bridge terminals as one arm of the bridge; a reference capacitor connected between a second pair of adjacent bridge terminals as a second arm of said bridge, a bridge output terminal; first, second, third and fourth diodes connected in closed series in front-to-back relationship with each other, the junction between said first and second diodes being connected to said bridge output terminal, the junction between said third and fourth diodes being connected to said fourth bridge terminal; a first capacitor connected between said first bridge terminal and the junction between said first and fourth diodes; a second capacitor connected between said third bridge terminal and the junction between said second and third diodes; and a third capacitor connected between said fourth bridge terminal and the junction between said first and second diodes;

(2) a voltage source comprising an oscillator having first and second output terminals, means for connecting said first output terminals of said oscillator to said second bridge terminal and for connecting said second output terminal of said oscillator to said fourth bridge terminal; and (3) a circuit comprising a D.C. differential amplifier having first and second input terminals and an output terminal; means connecting said first input terminal of said amplifier to said fourth bridge terminal; means connecting said second input terminal of said amplifier to said bridge output terminal; and indicating means connected to said output terminal of said amplifier.

4. Electrical measuring apparatus comprising in combination:

(1) a bridge network comprising first, second, third and fourth bridge terminals; a measuring capacitor connected between said first and second bridge terminals; a reference capacitor connected between said second and third bridge terminals; a first resistor connected between said third and fourth bridge terminals; a second resistor connected between said first and fourth bridge terminals; a third resistor, a potentiometer and a fourth resistor connected in series between said first and third bridge terminals; the contactor of said potentiometer being connected to said second bridge terminal; a bridge output terminal; first, second, third and fourth diodes connected in closed series in front-to-back relationship with each other, the junction between said first and second diodes being connected to said bridge output terminal, the junction between said third and fourth diodes being connected to said fourth bridge terminals; a first capacitor connected between said first bridge terminal and the junction between said first and fourth diodes; a second capacitor connected between said third bridge terminal and the junction between said second and third diodes; and a third capacitor connected between said fourth bridge terminal and the junction between said first and second diodes;

(2) a voltage source comprising an oscillator having first and second output terminals, means for connecting said first output terminal of said oscillator to said second bridge terminal and for connecting said second output terminal of said oscillator to said fourth bridge terminal; and (3) a circuit comprising a D.C. differential amplifier having first and second input terminals and an output terminal; means connecting said first input terminal of said amplifier to said fourth bridge terminal, means connecting said second input terminal of said amplifier to said bridge output terminal; and indicating means connected to said output terminal of said amplifier.

5. Electrical measuring apparatus comprising in combination:

(1) a plurality of bridge networks, each of said bridge networks comprising first, second, third and fourth bridge terminals; a measuring impedance connected between a first pair of said bridge terminals as one arm of the bridge; a reference impedance connected between a second pair of said bridge terminals as a second arm of said bridge; a bridge output terminal; first, second, third and fourth diodes connected in closed series in front-to-back relationship with each other, the junction between said first and second diodes being connected to said bridge output terminal, the junction between said third and fourth diodes being connected to said fourth bridge terminal; a first capacitor connected between said first bridge terminal and the junction between said first and fourth diodes; a second capacitor connected between said third bridge terminal and the junction between said second and third diodes; and a third capacitor connected between said fourth bridge terminal and the junction between said first and second diodes;

(2) a voltage source comprising an oscillator having first and second output terminals, means for connecting said first output terminal of said oscillator to said second bridge terminal of each of said plurality of bridge networks and for connecting said second output terminal of said oscillator to said fourth bridge terminal of each of said plurality bridge networks; and (3) a circuit comprising a D.C. differential amplifier having first and second input terminals and an output terminal; means for selectively connecting said first input terminal of said amplifier to the fourth bridge terminal of a respective one of said plurality of bridge networks and for selectively connecting said second input terminal of said amplifier to the bridge output terminal of said respective one of said plurality of bridge networks; and indicating means connected to said output terminal of said amplifier.

6. Electrical measuring apparatus comprising in combination:

(1) a bridge network comprising first, second, third and fourth bridge terminals; a measuring impedance connected between a first pair of adjacent bridge terminals as one arm of the bridge; a reference impedance connected between a second pair of adjacent bridge terminals as a second arm of said bridge; a bridge output terminal; first, second, third and fourth rectifying devices connected in closed series in front-to-back relationship with each other, the junction between said first and second rectifying devices being connected to said bridge output terminal, the junction between said third and fourth rectifying devices being connected to said fourth bridge terminal; a first capacitor connected between said first bridge terminal and the junction between said first and fourth rectifying devices; a second capacitor connected between said third bridge terminal and the junction between said second and third rectifying devices; and a third capacitor connected between said fourth bridge terminal and the junction between said first and second rectifying devices;

(2) a voltage source comprising an oscillator having first and second output terminals, means for connecting said first output terminal of said oscillator to said second bridge terminal and for connecting said second output terminal of said oscillator to said fourth bridge terminal; and (3) a circuit comprising a D.C. differential amplifier having first and second input terminals and an output terminal; means connecting said first input terminal of said amplifier to said fourth bridge terminal; and means connecting said second input terminal of said amplifier to said bridge output terminal.

7. Electrical measuring apparatus comprising in combination:

(1) a bridge network comprising a bridge having first, second, third and fourth bridge terminals; a measuring capacitor connected between said first and second bridge terminals; a reference capacitor connected between said second and third bridge terminals; a first impedance connected between said third and fourth bridge terminals; a second impedance connected between said first and fourth bridge terminals; at least one bridge rebalancing terminal; means connected between said at least one bridge rebalancing terminal and said bridge terminals to apply a rebalancing voltage to said bridge; a bridge output terminal; first, second, third and fourth rectifying devices connected in closed series in front-to-back relationship with each other, the junction between said first and second rectifying devices being connected to said bridge output terminal, the junction between said third and fourth rectifying devices being connected to said fourth bridge terminal; a first capacitor connected between said first bridge terminal and the junction between said first and fourth rectifying devices; a second capacitor connected between said third bridge terminal and the junction between said second and third rectifying devices; and a third capacitor connected between said fourth bridge terminal and the junction between said first and second rectifying devices;

(2) a voltage source comprising an oscillator having first and second output terminals, means for connecting said first output terminal of said oscillator to said second bridge terminal and for connecting said second output terminal of said oscillator to said fourth bridge terminal;

(3) a circuit comprising a D.C. differential amplifier having first and econd input terminals and an output terminal; means connecting said first input terminal of said amplifier to said fourth bridge terminal, means connecting said second input terminal of said amplifier to said bridge output terminal; and indicating means connected to said output terminal of said amplifier; and (4) a rebalancing circuit comprising means for applying a voltage responsive to the output of said amplifier to said at least one bridge rebalancing terminal.

8. Electrical measuring apparatus comprising in combination:

(1) a plurality of bridge networks, each of said bridge networks comprising a bridge having first, second, third and fourth bridge terminals; a measuring capacitor connected between said first and second bridge terminals; a reference capacitor connected between said second and third bridge terminals; a first impedance connected between said third and fourth bridge terminals; a second impedance connected between said first and fourth bridge terminals; at least one bridge rebalancing terminal; means connected between said at least one bridge rebalancing terminal and said bridge terminals to apply a rebalancing voltage to said bridge; a bridge output terminal; first, second, third and fourth rectifying devices connected in closed series in front-to-back relationship with each other, the junction between said first and second rectifying devices being connected to said bridge output terminal, the junction between said third and fourth rectifying devices being connected to said fourth bridge terminal; a first capacitor connected between said first bridge terminal and the junction between said first and fourth rectifying devices; a second capacitor connected between said third bridge terminal and the junction between said second and third rectifying devices; and a third capacitor connected between said fourth bridge terminal and the junction between said first and second rectifying devices;

(2) a voltage source comprising an oscillator having first and second output terminals, means for connecting said first output terminal of said oscillator to said second bridge terminal of each of said plurality of bridge networks and for connecting said fourth bridge terminal of each of said plurality bridge networks to said second output terminal of said oscillator;

(3) a circuit comprising a D.C. differential amplifier having first and second input terminals and an output terminal; means for selectively connecting said first input terminal of said amplifier to the fourth bridge terminal of a respective one of said plurality of bridge networks and for selectively connecting said second input terminal of said amplifier to the bridge output terminal of said respective one of said plurality of bridge networks; and indicating means connected to said output terminal of said amplifier; and (4) a rebalancing circuit comprising means for applying a voltage responsive to the output of said amplifier to said at least one bridge rebalancing terminal.

9. Electrical measuring apparatus comprising in combination:

(1) a bridge network comprising first, second, third and fourth bridge terminals; a measuring capacitor connected between a first pair of adjacent bridge terminals as one arm of the bridge; a reference capacitor connected between a second pair of adjacent bridge terminals as a second arm of said bridge; a bridge output terminal; first, second, third and fourth rectifying devices connected in closed series in front-to-back relationship with each other, the junction between said first and second rectifying devices being connected to said bridge output terminal, the junction between said third and fourth rectifying devices being connected to said fourth bridge terminal; a first capacitor connected between said first bridge terminal and the junction between said first and fourth rectifying devices; a second capacitor connected between said third bridge terminal and the junction between said second and third rectifying devices; and a third capacitor connected between said fourth bridge terminal and the junction between said first and second rectifying devices;
(2) a voltage source comprising an oscillator having first and second output terminals, means for connecting said first output terminal of said oscillator to said second bridge terminal and for connecting said second output terminal of said oscillator to said fourth bridge terminal; and
(3) a circuit comprising a D.C. differential amplifier having first and second input terminals and an output terminal; means connecting said first input terminal of said amplifier to said fourth bridge terminal, means connecting said second input terminal of said amplifier to said bridge output terminal; and indicating means connected to said output terminal of said amplifier.

No references cited.

WALTER L. CARLSON, *Primary Examiner.*

E. E. KUBASIEWICZ, *Assistant Examiner.*